(12) United States Patent
Handshaw et al.

(10) Patent No.: US 8,368,007 B2
(45) Date of Patent: Feb. 5, 2013

(54) COMPONENT FOR AND METHOD OF SEALING AN INTERNAL OPTICAL COMPARTMENT, AND SHOCK MOUNTING A WINDOW, OF AN IMAGING READER

(75) Inventors: Darran Handshaw, Sound Beach, NY (US); Yuly Mitelman, Stony Brook, NY (US); Eric Trongone, West Babylon, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 351 days.

(21) Appl. No.: 12/873,610

(22) Filed: Sep. 1, 2010

(65) Prior Publication Data

US 2012/0049052 A1 Mar. 1, 2012

(51) Int. Cl.
*H01J 5/02* (2006.01)
(52) U.S. Cl. .................................. 250/239; 250/208.1
(58) Field of Classification Search .................. 250/239, 250/208.1, 237 R; 235/462.22, 462.32, 462.33, 235/462.45, 462.43
See application file for complete search history.

(56) References Cited

U.S. PATENT DOCUMENTS

| 4,613,895 A | 9/1986 | Burkey et al. |
| 4,794,239 A | 12/1988 | Allais |
| 5,703,349 A | 12/1997 | Meyerson et al. |
| 6,889,904 B2 | 5/2005 | Bianculli et al. |
| 8,064,146 B2 * | 11/2011 | Iwasaki ........................ 359/703 |
| 2006/0131419 A1 | 6/2006 | Nunnink |

* cited by examiner

*Primary Examiner* — Que T Le (57) ABSTRACT

An imaging reader for electro-optically reading a target by image capture includes a window supported by a housing, a chassis mounted in the housing and having chassis walls bounding an optical compartment, and an imaging module in the optical compartment for capturing return light from the target through the window. A component seals the optical compartment and protects the window from shock forces. The component is mounted between the window and the chassis walls bounding an opening into the optical compartment, and surrounds a periphery of the window. The component is constituted of a compressible material that is compressed between the window and the chassis walls to isolate and seal the optical compartment from the housing.

19 Claims, 5 Drawing Sheets

COMPONENT FOR AND METHOD OF SEALING AN INTERNAL OPTICAL COMPARTMENT, AND SHOCK MOUNTING A WINDOW, OF AN IMAGING READER

DESCRIPTION OF THE RELATED ART

Solid-state imaging systems or imaging readers have been used, in both handheld and/or hands-free modes of operation, to electro-optically read targets to be decoded, such as one-dimensional bar code symbols, particularly of the Universal Product Code (UPC) symbology having a row of bars and spaces spaced apart along a scan direction, as well as two-dimensional symbols, such as the Code 49 symbology having a plurality of vertically stacked rows of bar and space patterns in a single symbol, as described in U.S. Pat. No. 4,794,239, and even non-symbol targets to be imaged, such as documents.

The known imaging reader includes a housing either held by an operator and/or supported on a support surface, a window supported by the housing and aimed at the target during reading, and an imaging engine or module supported by the housing and having a chassis bounding an optical compartment in which are accommodated a solid-state imager with a sensor array of photocells or light sensors that correspond to image elements or pixels in a field of view of the imager, and an imaging lens assembly for capturing return light scattered and/or reflected from the target being imaged along an imaging axis through the window, and for projecting the return light onto the sensor array to initiate capture of an image of the target. Such an imager may include a one- or two-dimensional charge coupled device (CCD) or a complementary metal oxide semiconductor (CMOS) device and associated circuits for producing and processing electrical signals corresponding to a one- or two-dimensional array of pixel data over the field of view. These electrical signals are decoded by a programmed microprocessor or controller into data indicative of the symbol being read, or into a picture of the target. Upon a successful decode, an indicator, such as a beeper or an indicating LED, within the housing is energized. The emitted light from the indicating LED is conducted to the exterior of the housing, typically through a lightpipe.

It is therefore known to use the imager for capturing a monochrome image of a target or symbol as, for example, disclosed in U.S. Pat. No. 5,703,349. It is also known to use the imager with multiple buried channels for capturing a full color image of the symbol as, for example, disclosed in U.S. Pat. No. 4,613,895. It is common to provide a two-dimensional CCD with a 640×480 resolution commonly found in VGA monitors, although other resolution sizes are possible.

In order to increase the amount of the return light captured by the sensor array, especially in dimly lit environments and/or at far range reading, the optical compartment of the known imaging module may also accommodate an illuminating light assembly for illuminating the target with illumination light from an illuminating light source, e.g., one or more light emitting diodes (LEDs) and illuminating lenses, for reflection and scattering therefrom, and an aiming light assembly for projecting an aiming light pattern or mark with aiming light from an aiming light source, e.g., an aiming laser or LEDs, through aiming lenses on the target prior to imaging.

Although the known imaging reader is at least partly sealed from the ambient exterior environment and is generally satisfactory for its intended purpose, the known chassis within the housing is unsealed or open with respect to the interior of the housing. Hence, the imaging module is susceptible not only to dust and like contaminants, but also to stray light, both of which may enter the optical compartment, either from inside or outside the housing. For example, if a movable trigger is provided on the housing, outside dust and/or outside stray light may enter through a passage along which the trigger is movable. Outside dust and/or outside stray light may also enter through housing ports or openings for cables. Inside dust is often created by internal parts rubbing against each other. For example, movement of the trigger against trigger contacts can create internal dust. If the housing is provided with a tilting mechanism in which the housing is tilted relative to a support base, then the tilting mechanism may also create inside dust during such tilting movement. Inside stray light can be produced by the aforementioned indicating LED and lightpipe, or from any other interior light source.

Any such dust that is deposited on any of the imaging, illuminating, or aiming assemblies, especially their lenses and the imager, or on an interior surface of the window, degrades reading performance and limits image capture quality over time. Any such stray light coming from unintended areas and invading the optical compartment interferes with the proper operation of the imaging module, especially the imager. If the return light traverses a folded light path within the optical compartment by being reflected by a field mirror within the optical compartment, then the dust problem is compounded if any dust is deposited on the field mirror. Also, a longer folded light path is more susceptible to dust and stray light than if the return light traversed a shorter straight line path to the imager.

Another problem of the known imaging reader resides in the aforementioned window through which the aiming light and/or the illumination light pass in one direction, while the return light passes in the opposite direction through the window. The window is typically made of glass or plastic, and is susceptible to scratching and breakage if dropped during rough handling. Replacement of a scratched or cracked window puts the reader out of service and decreases productivity.

Accordingly, it would be desirable to increase productivity by protecting the window from scratching and breakage and shock forces, as well as by resisting entry of dust and stray light into the optical compartment.

SUMMARY OF THE INVENTION

The present invention relates to an imaging reader for electro-optically reading a target by image capture. The reader includes a housing, a window supported by the housing, a chassis mounted in the housing and bounding an optical compartment, and an imaging engine or module mounted in the optical compartment for capturing return light from the target through the window. The imaging module includes a solid-state imager with a sensor array of photocells or light sensors, e.g., a CCD or CMOS device, and an imaging lens assembly. The imaging module also preferably includes an illuminating light assembly for illuminating the target through the window with illumination light from an illuminating light source, e.g., one or more light emitting diodes (LEDs) and illuminating lenses, for reflection and scattering therefrom, and an aiming light assembly for projecting an aiming light pattern or mark through the window with aiming light from an aiming light source, e.g., an aiming laser or LEDs, through aiming lenses on the target prior to imaging.

In accordance with this invention, a component is operative for sealing the optical compartment. The component comprises a component body mounted between the window and chassis walls bounding an opening into the optical compartment. The component body surrounds a periphery of the window and is constituted of a compressible material, e.g., an elastomeric material, such as rubber, that is compressed between the window and the chassis walls to isolate and seal the optical compartment from the housing.

Preferably, the component body has integral mounting projections that are received in mounting recesses integrally formed in the chassis to fixedly position the component body relative to the chassis. Also, the component body preferably has integral shock-absorbing projections that are received in shock-absorbing recesses integrally formed in the window to protect the window from shock forces. The component body advantageously has integral locating guides for orienting the window relative to the component body. In the preferred embodiment, the component body has a generally rectangular, annular, frame-like shape with four corner regions. The mounting projections are integrally formed at one side of the corner regions, and the shock-absorbing projections are integrally formed at an opposite side of the corner regions.

In accordance with this invention, the sealed and isolated optical compartment resists any dust from being deposited on any of the imaging, illuminating, or aiming assemblies, especially their lenses and the imager, and/or on an interior surface of the window. The sealed and isolated optical compartment also resists entry of any stray light that would otherwise degrade reading performance and limit image capture quality over time. The shock-mounted window is also reliably protected from shock forces.

Another feature of the present invention resides in a method of sealing an optical compartment bounded by chassis walls of a chassis mounted in a housing of an imaging reader for electro-optically reading a target by capturing return light from the target through a window supported by the housing. The method is performed by mounting a component having a component body between the window and the chassis walls, surrounding a periphery of the window with the component body, constituting the component body of a compressible material, and compressing the compressible material between the window and the chassis walls to isolate and seal the optical compartment from the housing. The component also protects the window from shock forces.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figures 1, 2:
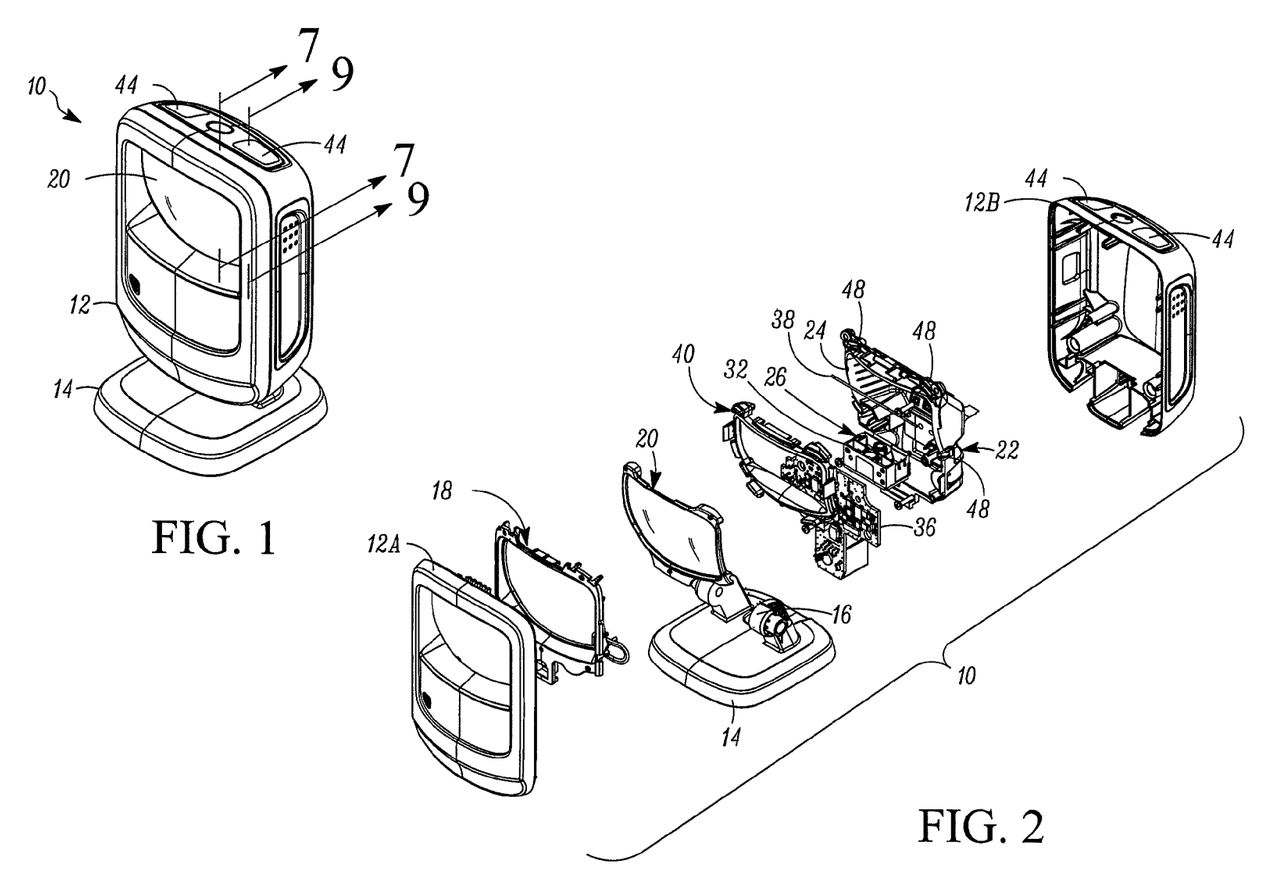
FIG. 1 is a perspective view of an assembled portable imaging reader operative for electro-optically reading a target or symbol by image capture that can benefit from and use this invention.
FIG. 2 is an exploded, perspective view depicting several internal components of the reader of FIG. 1.

Reference numeral 10 generally identifies an imaging reader for electro-optically reading a target by image capture. The reader 10 includes a box-like housing 12 mounted on a support base 14 that rests on a countertop or like planar support surface in a hands-free mode of operation. The reader 10 can also be lifted off the support surface in a handheld mode of operation. As best seen in FIG. 2, the housing 12 includes a front part 12A and a rear part 12B, both bounding a housing interior, and a ratchet-type tilting mechanism 16 for enabling the housing 12 to be tilted to, and locked at, a desired tilt angle relative to the base 14. Other housing configurations, such as a gun-like configuration, are contemplated for use with this invention.

Figure 5:
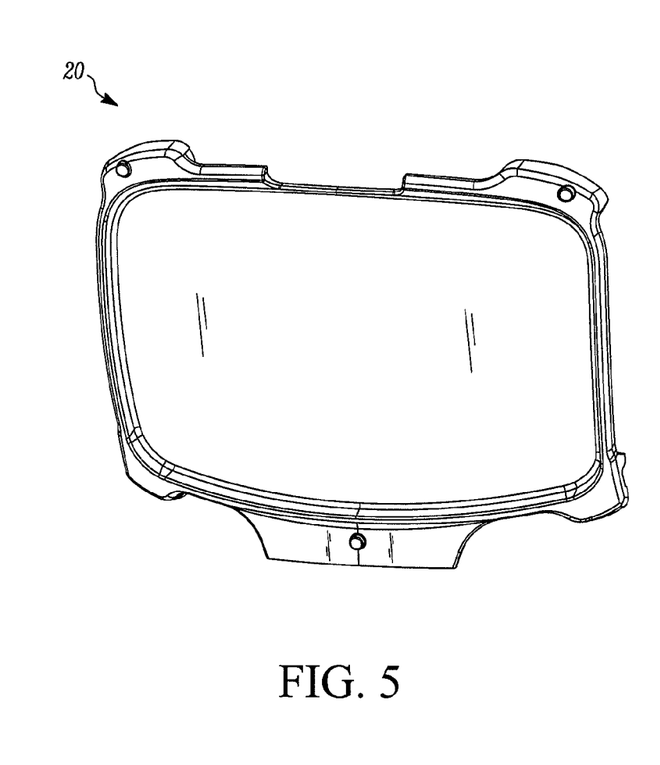
FIG. 5 is an enlarged, front perspective view of a window component of FIG. 2 in isolation in accordance with this invention.
Figure 6:
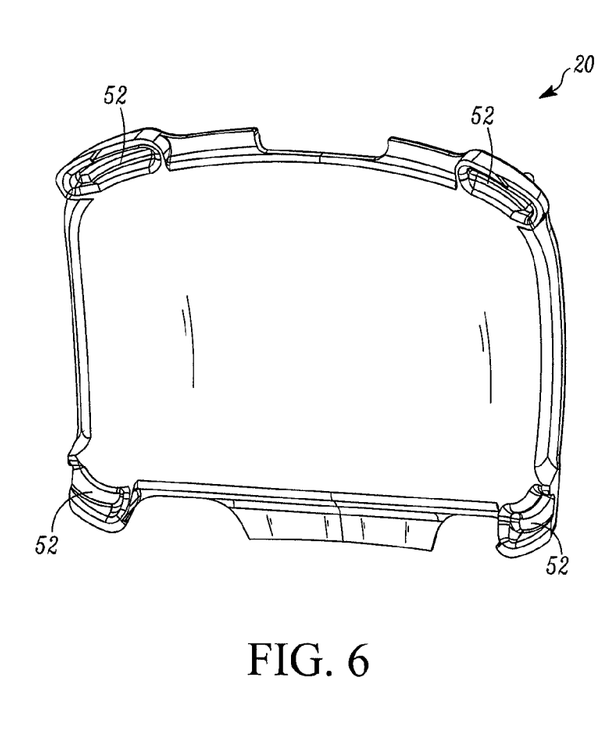
FIG. 6 is an enlarged, rear perspective view of the component of FIG. 5.

A light-transmissive window 20 is supported by the housing 12. In accordance with one aspect of this invention, the window 20 is a generally rectangular, injection-molded part, preferably of spherical contour, and is constituted of a non-polycarbonate, acrylic material that has good molding characteristics and good scratch resistance. Molded-in features of the window 20 are described below in connection with FIGS. 5-6. A rubber bumper 18 peripherally surrounds an exterior surface of the window 20 and is mounted between the window 20 and the front housing part 12A. The bumper 18 provides a measure of protection from shock forces.

A chassis 22 is mounted in the housing 12 and has chassis walls bounding an optical compartment 24. An imaging engine or module 26 is mounted in the optical compartment 24 for capturing return light from the target through the window 20. The imaging module 26 includes a solid-state imager 28 (see FIGS. 7-8) with a sensor array of photocells or light sensors, e.g., a CCD or CMOS device, and an imaging lens assembly 30. The imaging module 26 also includes an illuminating light assembly (not illustrated) for illuminating the target through the window 20 with illumination light from an illuminating light source, e.g., one or more light emitting diodes (LEDs) and illuminating lenses, for reflection and scattering from the target. An aiming light assembly is provided for projecting an aiming light pattern or mark through the window 20 with aiming light from an aiming light source 34 (see FIGS. 7-8), e.g., an aiming laser or one or more LEDs, through aiming lenses 32 on the target prior to imaging. Signal processing circuitry and a programmed microprocessor for controlling the electronic components and for processing and decoding the electrical signals produced by the imager are mounted on a printed circuit board 36.

In the illustrated optical configuration, the imaging and illuminating assemblies are recessed deep within the optical compartment 24 and face an overhead stationary field mirror 38 tilted at an angle of about 45 degrees. The mirror 38 is fixedly mounted in the optical compartment 24 and is operative for folding the light path of the light passing through the window 20 between vertical and horizontal directions. Additional folding mirrors could also be provided.

In accordance with one aspect of this invention, a component 40 is operative for sealing the optical compartment 24.

The component 40 comprises a generally rectangular, frame-like, component body mounted between the window 20 and chassis walls bounding an opening into the optical compartment 24. The component body surrounds a periphery of the window 20 and is constituted of a compressible material, e.g., an elastomeric material, such as rubber, that is compressed between the window 20 and the chassis walls to isolate and seal the optical compartment 24 from the housing 12. Thus, as described above, the sealed and isolated optical compartment 24 resists any dust from being deposited on any of the imaging, illuminating, or aiming assemblies, especially their lenses 30, 32 and the imager 28, and/or on an interior surface of the window 20, and/or on the field mirror 38. The sealed and isolated optical compartment 24 also resists entry of any stray light that would otherwise degrade reading performance and limit image capture quality over time. For example, an indicator, such as an indicating LED 42 (see FIG. 10), is mounted within the housing 12, but outside the chassis 22. Upon a successful decode, the indicating LED 42 is energized, and its emitted light is conducted to the exterior of the housing 12 through a pair of indicator panes 44. In the prior art, this emitted light could have leaked into the unsealed optical compartment 24 and degraded the captured target image.

Figure 3:
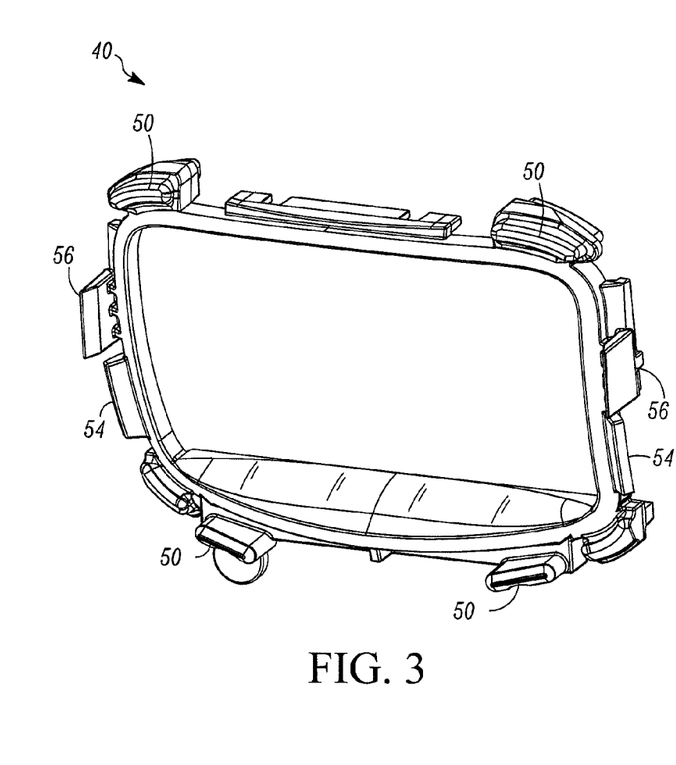
FIG. 3 is an enlarged, front perspective view of a sealing and shock-absorbing component of FIG. 2 in isolation in accordance with this invention.
Figure 4:
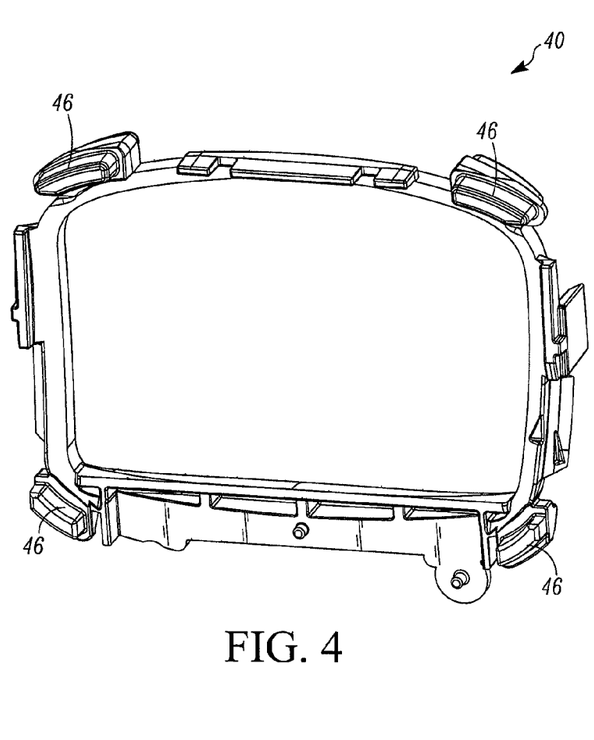
FIG. 4 is an enlarged, rear perspective view of the component of FIG. 3.

As shown in FIG. 4, the generally rectangular component body has a plurality of integral rear mounting projections 46 at its four corner regions that are respectively received in a plurality of mounting recesses 48 (see FIG. 2) integrally formed and molded in the chassis 22 to fixedly position the component body relative to the chassis 22. Also, as shown in FIG. 3, the component body has a plurality of integral front shock-absorbing projections 50 at its four corner regions that are respectively received in a plurality of shock-absorbing recesses 52 (see FIG. 6) integrally formed and molded in the window 20 to further protect the window 20 from shock forces. Thus, the window 20 is reliably protected from shock forces at its opposite sides by the aforementioned bumper 18 and by the integral shock mounts 50, 52.

The component body also has a plurality of integral locating guides 54 for orienting the window 20 relative to the component body, as well as a plurality of integral side guides 56 for orienting the component 40 relative to the chassis 22.

Figure 7:
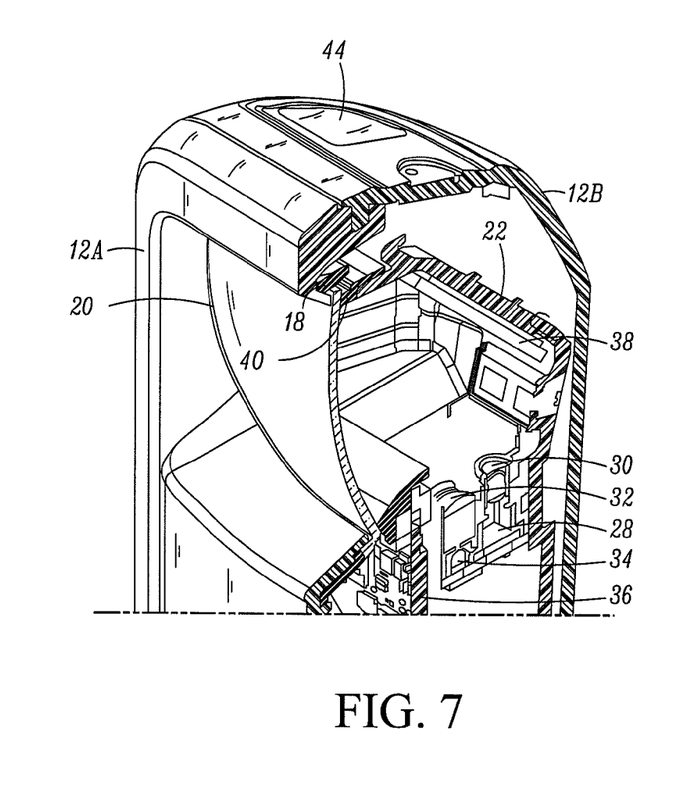
FIG. 7 is an enlarged, broken-away, isometric, perspective view taken on line 7-7 of FIG. 1.
Figure 8:
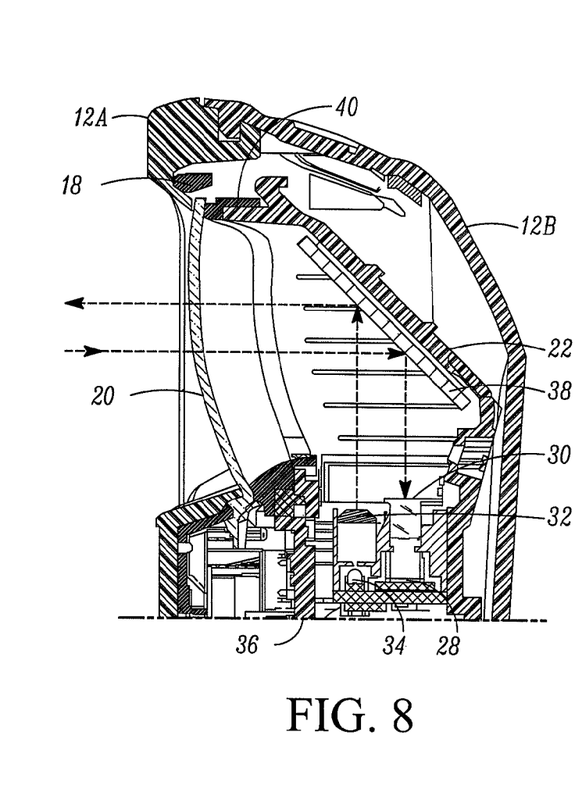
FIG. 8 is an isometric, sectional view taken on the line 7-7 of FIG. 1.
Figure 9:
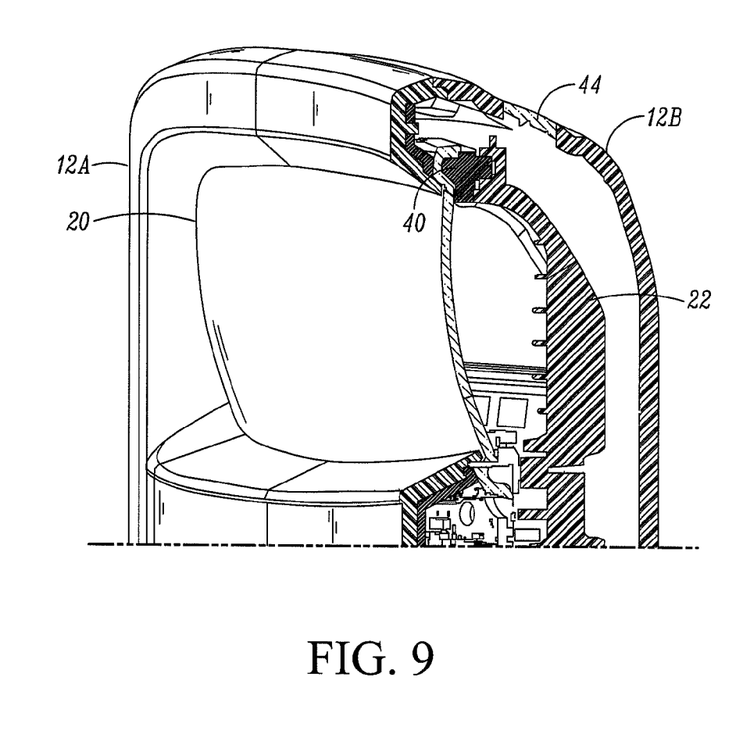
FIG. 9 is an enlarged, broken-away, isometric, perspective view taken on line 9-9 of FIG. 1.
Figure 10:
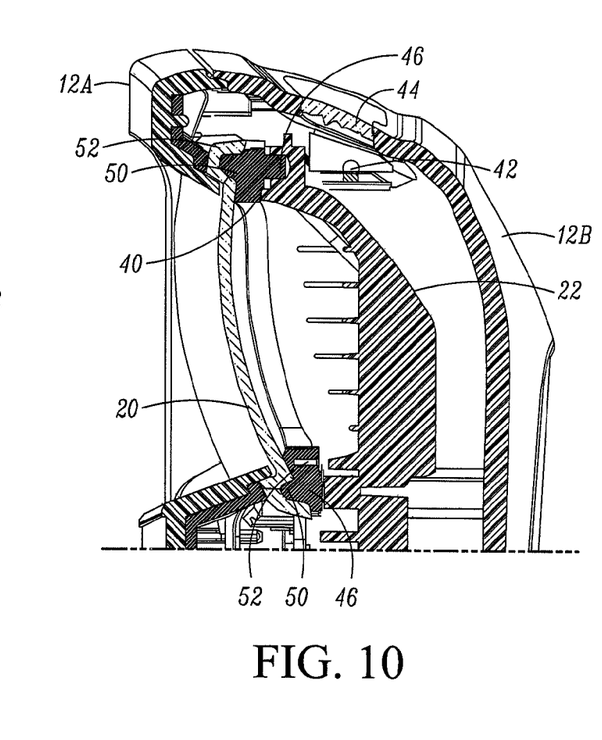
FIG. 10 is an isometric, sectional view taken on the line 9-9 of FIG. 1.

FIGS. 7-8 depict the assembled components as taken along a central line of the reader 10, and FIGS. 9-10 depict the assembled components as taken along an offset line. FIG. 8 best shows the folded light path. FIG. 10 best shows the receipt of the rear mounting projections 46 into the mounting recesses 48, and the receipt of the shock-absorbing projections 50 in the shock-absorbing recesses 52.

It will be understood that each of the elements described above, or two or more together, also may find a useful application in other types of constructions differing from the types described above.

While the invention has been illustrated and described as a component for, and a method of, sealing an optical compartment in an imaging reader, as well as protecting a window of the reader from shock forces, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. In an imaging reader for electro-optically reading a target by image capture, the reader including a housing, a window supported by the housing, a chassis mounted in the housing and having chassis walls bounding an optical compartment, and an imaging module in the optical compartment for capturing return light from the target through the window, a component for sealing the optical compartment, the component comprising:
   a component body mounted between the window and the chassis walls bounding an opening into the optical compartment, the component body surrounding a periphery of the window and being constituted of a compressible material that is compressed between the window and the chassis walls to isolate and seal the optical compartment from the housing.

2. The component of claim 1, wherein the component body has integral mounting projections that are received in mounting recesses in the chassis to fixedly position the component body relative to the chassis.

3. The component of claim 1, wherein the component body has integral shock-absorbing projections that are received in shock-absorbing recesses in the window to protect the window from shock forces.

4. The component of claim 1, wherein the component body has integral locating guides for orienting the window relative to the component body.

5. The component of claim 1, wherein the component body has a generally rectangular shape with corner regions, wherein the component body has integral mounting projections at one side of the corner regions for receipt in mounting recesses in the chassis, and wherein the component body has integral shock-absorbing projections at an opposite side of the corner regions for receipt in shock-absorbing recesses in the window.

6. An imaging reader for electro-optically reading a target by image capture, comprising:
   a housing;
   a window supported by the housing;
   a chassis mounted in the housing and having chassis walls bounding an opening into an optical compartment;
   an imaging module in the optical compartment for capturing return light from the target through the window; and
   a component for sealing the optical compartment, the component having a component body mounted between the window and the chassis walls, the component body surrounding a periphery of the window and being constituted of a compressible material that is compressed between the window and the chassis walls to isolate and seal the optical compartment from the housing.

7. The reader of claim 6, wherein the chassis has mounting recesses, and wherein the component body has integral mounting projections that are received in the mounting recesses to fixedly position the component body relative to the chassis.

8. The reader of claim 6, wherein the window has shock-absorbing recesses, and wherein the component body has integral shock-absorbing projections that are received in the shock-absorbing recesses to protect the window from shock forces.

9. The reader of claim 6, wherein the component body has integral locating guides for orienting the window relative to the component body.

10. The reader of claim 6, wherein the component body has a generally rectangular shape with corner regions, wherein the chassis has mounting recesses, wherein the component body has integral mounting projections at one side of the corner regions for receipt in the mounting recesses, wherein the window has shock-absorbing recesses, and wherein the component body has integral shock-absorbing projections at an opposite side of the corner regions for receipt in the shock-absorbing recesses.

11. The reader of claim 6, and a field mirror in the chassis for folding a path of the return light, and wherein the component isolates and seals the field minor from the housing.

12. The reader of claim 6, and a bumper between the window and the housing for protecting the window from shock forces.

13. A method of sealing an optical compartment bounded by chassis walls of a chassis mounted in a housing of an imaging reader for electro-optically reading a target by capturing return light from the target through a window supported by the housing, the method comprising the steps of:
mounting a component having a component body between the window and the chassis walls, surrounding a periphery of the window with the component body, constituting the component body of a compressible material, and compressing the compressible material between the window and the chassis walls to isolate and seal the optical compartment from the housing.

14. The method of claim 13, and fixedly positioning the component body relative to the chassis by forming the chassis with mounting recesses, by forming the component body with integral mounting projections, and by receiving the mounting projections in the mounting recesses.

15. The method of claim 13, and protecting the window from shock forces by forming the window with shock-absorbing recesses, by forming the component body with integral shock-absorbing projections, and by receiving the shock-absorbing projections in the shock-absorbing recesses.

16. The method of claim 13, and orienting the window relative to the component body by forming integral locating guides on the component body.

17. The method of claim 13, and configuring the component body as a generally rectangular shape with corner regions, and forming the chassis with mounting recesses, and forming the component body with integral mounting projections at one side of the corner regions for receipt in the mounting recesses, and forming the window with shock-absorbing recesses, and forming the component body with integral shock-absorbing projections at an opposite side of the corner regions for receipt in the shock-absorbing recesses.

18. The method of claim 13, and injection molding the window with the shock-absorbing recesses.

19. The method of claim 13, and injection molding the window with a spherical configuration.

* * * * *

UNITED STATES PATENT AND TRADEMARK OFFICE
CERTIFICATE OF CORRECTION

PATENT NO. : 8,368,007 B2
APPLICATION NO. : 12/873610
DATED : February 5, 2013
INVENTOR(S) : Handshaw et al.

It is certified that error appears in the above-identified patent and that said Letters Patent is hereby corrected as shown below:

In the Claims

In Column 7, Line 12, in Claim 11, delete "minor" and insert -- mirror --, therefor.

Signed and Sealed this
Fifteenth Day of October, 2013

Teresa Stanek Rea
*Deputy Director of the United States Patent and Trademark Office*